United States Patent [19]

Bussink et al.

[11] Patent Number: 4,864,011

[45] Date of Patent: Sep. 5, 1989

[54] METHOD OF PREPARING AN AROMATIC POLYCARBONATE WITH PHENOLIC CHLOROFORMATE CHAIN STOPPER

[75] Inventors: Jan Bussink, CT Bergen op Zoom; Hugo G. E. Ingelbrecht, Essen; Vinayak Vaishnav, CV Leiden, all of Netherlands

[73] Assignee: General Electric Company, Mt. Vernon, Ind.

[21] Appl. No.: 98,170

[22] Filed: Sep. 18, 1987

[30] Foreign Application Priority Data

Sep. 18, 1986 [NL] Netherlands ............... 8602363

[51] Int. Cl.$^4$ ............................................. C08G 63/62
[52] U.S. Cl. ....................................... 528/198; 528/196
[58] Field of Search ........................................ 528/198

[56] References Cited

U.S. PATENT DOCUMENTS

| | | | |
|---|---|---|---|
| 3,475,373 | 10/1969 | Jackson et al. | 528/198 |
| 4,269,964 | 5/1981 | Freitag et al. | 528/126 |
| 4,330,663 | 5/1982 | Rosenquist | 528/176 |
| 4,431,793 | 2/1984 | Rosenquist | 528/198 |
| 4,446,296 | 5/1984 | Rosenquist | 528/198 |
| 4,448,953 | 5/1984 | Rosenquist et al. | 528/198 |
| 4,460,752 | 7/1984 | Neuray et al. | 525/462 |
| 4,556,704 | 12/1985 | Rosenquist | 528/198 |

FOREIGN PATENT DOCUMENTS 1173998 9/1984 Canada .

OTHER PUBLICATIONS

PPG Brochure—Phenyl Chloroformate, 1980, A-13-52-540 2M 380A.

*Primary Examiner*—Harold D. Anderson
*Attorney, Agent, or Firm*—Martin B. Barancik

[57] ABSTRACT

The invention relates to a method of preparing aromatic polycarbonate according to the two-phase interface process. The molecular weight is controlled by the addition of a chain stopper. The use of a phenolic chloroformate as a chain stopper leads to a polycarbonate having a low content of volatile constituents.

3 Claims, No Drawings

METHOD OF PREPARING AN AROMATIC POLYCARBONATE WITH PHENOLIC CHLOROFORMATE CHAIN STOPPER

The invention relates to a method of preparing an aromatic polycarbonate from a carbonate precursor and a diphenol according to the phase boundary process while using a phenolic chain stopper.

U.S. Pat. No. 4,269,964 describes a method as indicated above, in which t-butylphenol, or rather $C_8-C_9$ alkylphenols, are used as chain stoppers. In the examples according to the said Patent Specification, the chain stopper is first added, after which the carbonate precursor is introduced into the reaction solution.

The use of the phenolic chain stoppers mentioned hereinbefore makes it possible to control the molecular weight of the polycarbonate to be formed: when a polycarbonate having a comparatively low molecular weight is to be obtained, a comparatively large quantity of the chain stopper is generally used, and conversely.

However, the above-described method has an important disadvantage: under the reaction conditions used, volatile constituents are formed from the chain stopper which during the isolation of the polycarbonate are hard to remove. An example of such a volatile constituent is diphenyl carbonate which is formed when phenol itself is used as a chain stopper. The quantity of this and other volatile compounds is the larger as more chain stopper is used. In practice this means that the content of volatile constituents in polycarbonate having a comparatively low molecular weight is higher than in polycarbonate having a comparatively high molecular weight. This is an important disadvantage because the mechanical properties of a polycarbonate having a comparatively low molecular weight (for example, from 10,000 to 25,000) are influenced to a stronger extent by the presence of volatile constituents than polycarbonate having a comparatively high molecular weight. In addition, the volatile constituents upon injection-moulding articles from the polycarbonate tend to form deposits on the surface of the injection moulding matrix and of the article to be moulded. At present, polycarbonate having a comparatively low molecular weight is used in particular for the manufacture of information carriers which can be read optically. In such carriers, a deposit on the surface is extremely disturbing.

The invention provides a method with which a polycarbonate can be obtained with a low content of volatile constituents, also when comparatively large quantities of chain stopper are used.

The method according to the invention is characterised in that a compound of the formula

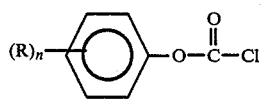

is used as a phenolic chain stopper, in which R is an alkyl radical or an aryl radical having 1-12 carbon atoms or a hydrogen atom, and in which n represents a whole number from 0 to 5 inclusive. By preference n=1 and R is in the para position with respect to the —O—COCl group.

It has been found that optium results, i.e. an as low as possible content of volatile constituents, are obtained when the chain stopper is added to the reaction mixture after 20–80%, even more preferably 20–50%, of the quantity of carbonate precursor to be added totally, have been introduced into the reaction mixture.

In the method according to the invention the chain stopper is preferably used in a quantity of from 2 to 7 mol.% calculated with respect to the number of moles of diphenol used.

A polycarbonate having a content of diphenyl carbonate of less than 50 ppm is obtained by means of the method according to the invention. Diphenyl carbonate is to be understood to include also di(alkylphenyl-carbonates and di(arylphenyl)carbonates.

An additional advantage of the method according to the invention is that the resulting polycarbonate has a smaller poly dispersity. Poly dispersity is to be understood to mean the quotient of the weight-averaged molecular weight ($M_w$) and the number-averaged molecular weight ($M_n$). The poly dispersity of the polycarbonate obtained by means of the method according to the invention is usually smaller than 2.

Phenyl chloroformate is preferably used as a chain stopper in the method according to the invention.

Canadian No. 1173998 describes the preparation of polyester carbonates using phenolic chain stoppers. According to the general teaching the chain stopper of the Patent Application just mentioned may be present in the form of the phenol itself, the acid chloride or the chlorocarbonic acid ester, CA1173998 further states "if acid chlorides and chlorocarbonic acid esters are used as the chain terminator, they are preferably used together with the aromatic dicarboxylic acid dichlorides and/or the phosgene. These chain terminators may also be added to the reaction mixture at the stage when the chlorides of the dicarboxylic acids and the phosgene have extensively or completely reacted". In the examples according to CA 1173998 the chain stopper is always used in the phenol form; the chain stopper is added to the reaction mixture sooner than or simultaneously with the phosgene. CA 1173998 does not give any particulars regarding the content of volatile constituents in the obtained polyester carbonate.

U.S. Pat. No. 4,330,663 describes the preparation of polyester-carbonate polymers containing benzoate or substituted benzoate ester terminal groups. Said terminal groups are obtained by reacting the polyester carbonate with a (substituted) benzoylchloride. Said terminal groups result in a polyester carbonate with a higher heat distortion temperature.

U.S. Pat. No. 3,475,373 describes the stabilisation of polycarbonates with haloformates or acid halides. In this known method a polycarbonate resin is prepared. The polymerised polycarbonate is then treated in solution with a haloformate or acid halide. The resulting product is then converted with a monohydroxy compound. In this method, the haloformate or acid halide does not serve as a chain stopper. A product leaflet of PPG Industries regarding phenyl chloroformate seems to refer to this application. It is stated in this leaflet: "polycarbonate producers have used phenyl chloroformate as a polymerisation inhibitor".

The method according to the invention relates to a phase boundary process of preparing an aromatic polycarbonate while using a chain stopper. Such a method is generally known: for this purpose, reference may be made to H. Schnell, Chemistry an Physics of Polycarbonates, New York, 1964, or also to EP-A-No. 178609 and U.S. Pat. No. 4,403,087.

In the two-phase interface process one or more different diphenol compounds are dissolved in an aqueous alkaline phase. The diphenol is converted with the carbonate precursor in the presence of an inert organic phase.

Suitable diphenol compounds are generally known from literature. It is also possible to use mono- and/or bischlorocarboxylic acid esters of the diphenols.

It is possible to perform the polymerisation in the precence of a small quantity of trifunctional or more than trifunctional phenolic compound. Branched polycarbonates are then obtained.

In general, the chain stopper is added at the beginning of the reaction. As an inert organic phase is usually used methylene chloride, chlorobenzene or a mixture of these solvents.

The polymerisation reaction may be carried out in the presence of a catalyst, for example, in the presence of a tertiary amine, for example, tributylamine and triethylamine. The catalyst may be added before, during or after the addition of the carbonate precursor.

Examples of suitable chain stoppers for the method according to the invention are phenyl chloroformate, t-butyl-phenyl chloroformate, octyl- or nonylphenyl chloroformate, in which the octyl group or nonyl group may be branched, paracumyl phenyl chloroformate and other substituted phenyl chloroformates.

These are compounds known per se whose preparation is known.

Various compounds may be used as carbonate precursors. Phosgene is preferable used as such. The preferably used diphenol compound is 2,2-bis-(4,4-dihydroxy-diphenyl)propane (=bisphenol A). Also suitable are, for example, tetramethyl bisphenol A; 1,1-bis-(4-hydroxyphenyl)-isobutane; 1,1-bis-(4-hydroxyphenyl)-cyclohexane; 4,4'-dihydroxydiphenyl sulphide; 4,4'-dihydroxydiphenyl; 4,4'-dihydroxydiphenyl sulphone and the di- or tetra-halogenated derivatives.

The invention will now be described in greater detail with reference to the ensuing specific examples.

EXAMPLE I

Phosgene (5 g per minute) was led in a reaction flask with 300 g of bisphenol-A, 1,000 ml of methylene chloride, 750 ml of water, and 1,9 ml of triethylamine, while the pH was kept at 10.5 by addition of a 33% NaOH solution.

After the addition of 30 g of phosgene, the phosgene supply was interrupted and 11.65 g of phenyl chloroformate in the form of a 20% solution in methylene chloride was added dropwise.

Phosgene was then supplied again until totally 145 g of phosgene had been added. The formed polymer was neutralised with 1 N hydrochloric acid and then washed with water. The organic phase with polymer was separated from the aqueous phase. The polymer was obtained by evaporating the organic solvent.

The resulting polymer had an intrinsic viscosity of 42.4 parts/g (measured in $CH_2 Cl_2$ at 25° C.) and a free hydroxyl group content of 60 ppm. The content of diphenyl carbonate in the polymer was determined by means of Gel Permeation Chromatography: it was below the detection limit of 10 ppm.

EXAMPLE II (COMPARATIVE EXAMPLE)

The polymerisation was carried out in substantially the same manner as in Example I. The only difference was as follows: at the onset of the reaction, 79 g of phenol had been added to the mixture and the phosgene addition had not been interrupted to add phenyl chloroformate.

The resulting polymer had an intrinsic viscosity of 43.8 parts/g and a free hydroxyl group content of 82 ppm. The content of diphenyl carbonate was 1546 ppm.

EXAMPLE III

A series of reaction experiments were carried out in which an aromatic polycarbonate was prepared from bisphenol A and phosgene in a 30-liter-reactor.

At the onset of the reaction, 2270 g of bisphenol A, 6 liters of water, 7 liters of $CH_2 Cl_2$ and 15 ml of catalyst were present. In the reactions with phenol as a chain stopper, the phenol was always added before the beginning of the phosgene addition. The pH value was kept at a value of 9.5–10.5 during the greater part of the reaction by the addition of a lye solution. Towards the end of the reaction the pH was adjusted at a higher value.

Phenol or phenyl chloroformate was used as a chain stopper. The phenol was always added before phosgene was led into the reaction mixture. The phenyl chloroformate was added at various instants (see Tables A+B).

Different quantities of phenol and phenyl chloroformate were used, so that different polycarbonates were obtained with different intrinsic values. Table A approximately 40–45 parts/g; Table B approximately 58–63 parts/g.

Not only the content of diphenyl carbonate, but also the content of the following oligomers was determined in the polymer:

I: one mol of bisphenol A coupled to two mol of phenol or phenyl chloroformate

II: two mol of bisphenol A coupled to two mol of phenol or phenyl chloroformate

III: three mol of bisphenol A coupled to two mol of phenol or phenyl chloroformate The results obtained are summarized hereinafter in Tables A and B. The concentrations of the said oligomers were determined by means of GPC analysis with UV detection. The value of the detection signal was calibrated by means of diphenyl carbonate calibration standard solutions. This means that the recorded concentrations of oligomers I, II, and III apply as relative values.

TABLE A

| Chain stopper (quantity in g) | IV (parts/g) | Content of diphenyl carbonate (ppm) | Oligomers No. (wt. %) | | | Free OH (ppm) |
|---|---|---|---|---|---|---|
| | | | I | II | III | |
| Phenol (53 g) Phenylchloroformate (88 g) added after | 44.6 | 1995 | 0.34% | 0.36% | 0.90% | 81 |
| 0% reaction | 46.3 | 327 | 1.38% | 0.28% | 1.04% | |
| | | | | | 100 | |

TABLE A-continued

| Chain stopper (quantity in g) | IV (parts/ g) | Content of diphenyl carbonate (ppm) | Oligomers No. (wt. %) I | II | III | Free OH (ppm) |
|---|---|---|---|---|---|---|
| 20% reaction | 41.7 | 133 | 0.43% | 0.21% | 0.85% 102 | |
| 30% reaction | 41.8 | 108 | 0.30% | 0.28% | 0.84% | 98 |
| 40% reaction | 42.0 | 117 | 0.28% | 0.27% | 0.85% | 93 |

TABLE B

| Chain stopper (quantity in g) | IV (parts/ g) | Content of diphenyl carbonate (ppm) | Oligomers No. (wt. %) I | II | III | Free OH (ppm) |
|---|---|---|---|---|---|---|
| Phenol (30 g) Phenylchloroformate (51 g) added after | 62.8 | 733 | 0.19% | 0.25% | 0.60% | 74 |
| 25% reaction | 60.8 | 103 | 0.13/ 0.22% | 0.32/ 0.73% | 0.73% | 94 |
| 35% reaction | 60.2 | 69 | 0.15/ 0.29 | 0.31/ 0.70% | 0.70% 129 | |

The following may be derived from the results of Table A:
(1) phenyl chloroformate always results in a lower content of diphenyl carbonate than phenol;
(2) addition of phenyl chloroformate, when added at the onset of the reaction, leads to a higher content of oligomer I than when phenol is used;
(3) the addition of phenyl chloroformate after a part of the phosgene has been added, leads to a further reduction of the diphenyl carbonate content and of the content of oligomers, in particular of oligomer I.

We claim:

1. A method of preparing an aromatic polycarbonate comprising reacting a carbonate precursor with a diphenol in the presence of a chainstopper according to the phase boundary process wherein the chainstopper is a compound of the formula

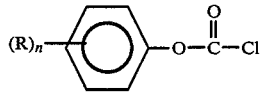

wherein R is an alkyl radical or an aryl radical having 1-12 carbon atoms or a hydrogen atom and n is a whole number from 0-5 inclusive with the proviso that when n is other than zero and R is an alkyl radical, then the chain stopper is added to the reaction mixture after 20 to 80 percent of the quantity of carbonate precursor to be added totally has been added to the reaction mixture.

2. A method as claimed in claim 1, characterised in that the chain stopper is added to the reaction mixture after 20-80% of the quantity of carbonate precursor to be added totally have been added to the reaction mixture.

3. A method as claimed in claim 1, wherein the quantity of chainstopper is 2-7 mole % based on moles of diphenol.

* * * * *